July 1, 1930.  C. G. H. SWINDEN  1,769,398

WORKHOLDING VISE

Filed Sept. 15, 1928  2 Sheets-Sheet 1

INVENTOR.
C.G.H.SWINDEN.
BY Fetherstonhaugh & Co.
ATTYS.

July 1, 1930.  C. G. H. SWINDEN  1,769,398
WORKHOLDING VISE
Filed Sept. 15, 1928   2 Sheets-Sheet 2

INVENTOR.
C.G.H.SWINDEN.
By Fetherstonhaugh Co.
ATTYS.

Patented July 1, 1930

1,769,398

UNITED STATES PATENT OFFICE

CLAUDE GEORGE HENRY SWINDEN, OF LONDON, ENGLAND

WORKHOLDING VISE

Application filed September 15, 1928, Serial No. 306,203, and in Great Britain January 10, 1928.

This invention relates to work-holding vises and particularly to such vises comprising slidable concentric cylindrical members carrying the co-operating jaws and adapted to be adjustably clamped in a fixed casing to allow of the rotation of the jaws as a whole. Such vises are actuated by means of a co-operating nut and screwed spindle, the one carried by one of the tubular members and the other anchored in the other tubular member.

For example, the screwed spindle may be carried by the inner member secured to the front jaw, and the nut anchored by means of a radial lug extending through a longitudinal slot in the inner member into a retaining hole in the outer member, secured to the rear or fixed jaw. An oppositely-disposed lug on the nut may be similarly arranged, to extend through another longitudinal slot in the inner member into another retaining hole in the outer member; or, alternatively, this second lug may be a short lug extending into a longitudinal groove in the inner face of the inner member.

The primary object of the invention is to provide an improved vise of this character.

A further object of the invention is to provide such a vise the jaws of which can be instantaneously released from or brought up to the work in hand.

Further objects of the invention comprise the provision of similar uneven segmental mutilations of the threads of the nut and screwed spindle, whereby in one angular position of the spindle with regard to the nut the spindle can be withdrawn axially without being rotated; and, moreover, the provision of multilations partly over the whole depth of the threads and partly over a portion only of the depth.

These and other objects of the invention will be more fully apparent if attention be paid to the following specification, in which reference is made to the drawings. The novel features of the invention are pointed out with particularity in the claims appended hereto.

The accompanying drawings illustrate one construction of work-holding vise embodying the present invention.

Figure 1:
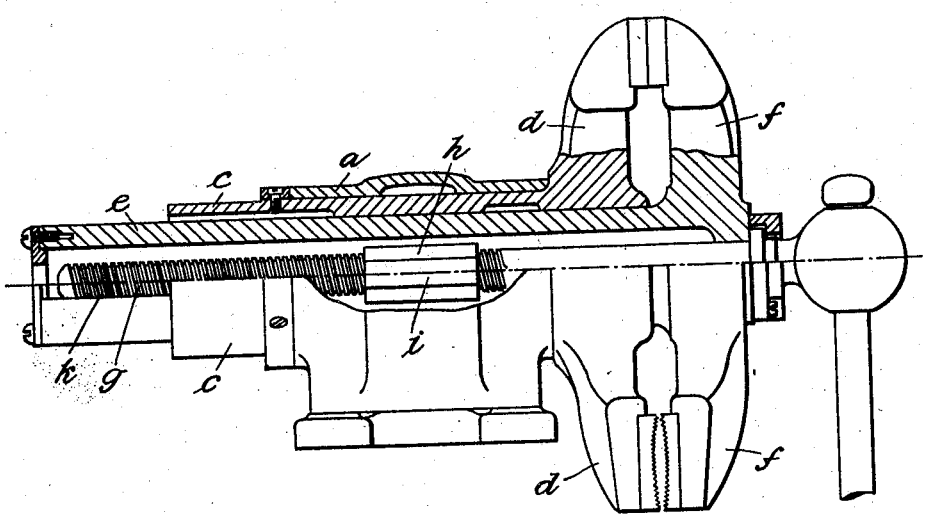
Fig. 1 is a side elevation partly in section.
Figure 3:
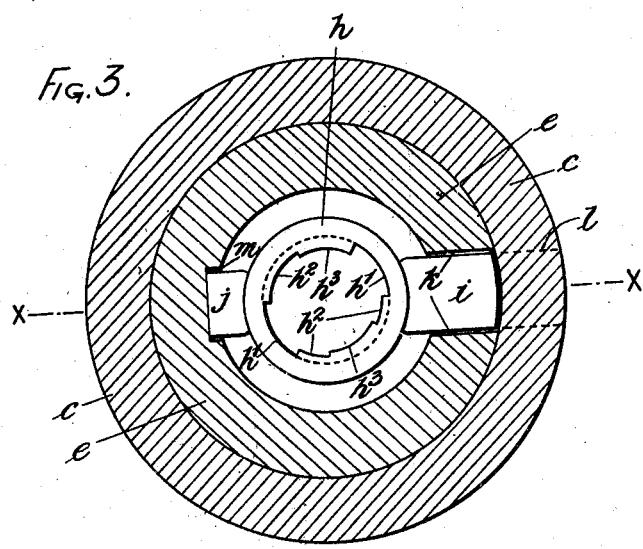
Fig 3 is an enlarged section through the nut of the screw together with the surrounding cylindrical extensions of the jaws, and, Fig. 4 is a section through the nut, on line X—X of Fig. 3.
Figure 2:
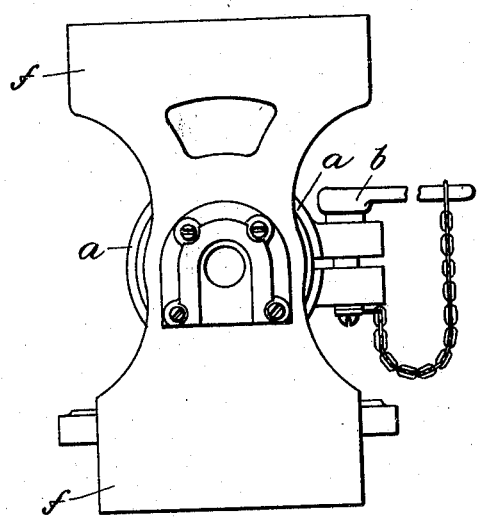
Fig. 2 is an end view of Fig. 1.
Figure 4:
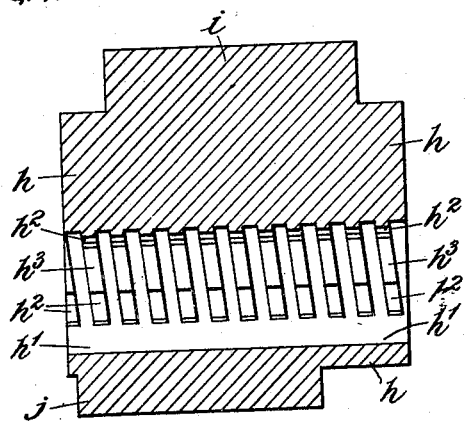

In the drawings, $a$ is the outer split casing provided with a clamping screw $b$ by which the outer cylindrical extension $c$ of the rear jaw $d$ is clamped within the said casing $a$ so as to present the jaws in the required angular position.

$e$ is the inner cylindrical extension of the front jaw $f$, $g$ is the screwed spindle passing through the cylindrical extension of the front jaw $f$, and $h$ is the nut engaged by said screw, the said nut being anchored in position by diametrical opposite radial flanges $i$ and $j$, the flange $i$ extending through a longitudinal slot $k$ in the cylindrical extension $e$ into a retaining hole $l$ in the extension $c$, while the radial flange $j$ engages a longitudinal groove $m$ formed in the face of the inner cylindrical extension $e$.

The nut $h$ is mutilated or cut away longitudinally through the threaded portion into unequal segments, part of each segment being cut to a depth equal to one half, and the other part equal to the full depth of the thread, the circumferential extension of the full cut and half cut portions being varied in each segment.

The operating screwed spindle $g$ is mutilated or cut away longitudinally in an opposite manner to the nut for similar depths of nut, that is to say, each segment of the nut where the thread is cut entirely away has a corresponding segment in the screwed spindle $g$ with a full thread, and each segment or portion of the segment with a half thread has a corresponding segment or portion of a segment in the screwed spindle $g$ with a half thread, and for each segment or portion of the segment of the nut $h$ which has a full thread there is a corresponding segment in the screwed spindle $g$ without any thread.

In the drawings, the nut is provided with segments $h^1$ without any thread, $h^2$ with half a thread and $h^3$ with a full thread. In a similar way the screwed spindle $g$ is provided with segments without any thread, with half thread, and with full thread corresponding to the portions $h^3$, $h^2$, $h^1$, respectively.

The improved vise gives the required angular adjustment of the jaws usual with this type of vise, while the particular construction and arrangement of spindle $g$ and nut $h$ with mutilated segmental threads is so arranged that in one, and one only certain relative position of the nut $h$ and the screwed spindle $g$ the latter can be withdrawn from the former longitudinally without rotating the screw in the nut, thereby giving an instantaneous release to the front jaw $f$ at the same time the normal efficiency of the vise is preserved.

I claim:—

1. A work-holding vise comprising concentric cylindrical members fixed to co-operating jaws, a co-operating nut and screw carried by said cylindrical members respectively, for effecting relative axial movement thereof, and corresponding segmental mutilated threads on the nut and screw adapted to register in only one angular position, throughout 360° of the screw with respect to the nut to allow of the separation or bringing together of the jaws without relative rotation between the nut and screw, said threads being cut away so that spaced contacts between the nut and screw will always be obtained except when said nut and screw are in said one angular position.

2. A work-holding vise comprising concentric cylindrical members formed integrally with co-operating jaws, means adjustably clamping the outer cylindrical member, a screwed spindle swivelled in one cylindrical member, and a nut threaded on said spindle and anchored in the other cylindrical member, the threads of said nut and spindle being correspondingly mutilated to allow relative axial movement between the nut and spindle without relative rotation there-between when the nut is angularly disposed with respect to the spindle in one predetermined position, out of each 360° and so that, when the nut and spindle are not in said one predetermined position, the nut and spindle will engage with one another at at least two spaced points.

3. In a work-holding vise having a co-operating nut and screwed spindle for actuating the jaws towards and away from one another, uneven segmental mutilations in the thread of the nut and corresponding mutilations in the thread of the spindle along a length thereof, said mutilations being arranged so that the nut and thread are relatively axially slidable in one angular position only out of each 360° and so that spaced contacts will always be obtained between the nut and screw when they are not in said one angular position.

4. In a work-holding vise having a co-operating nut and screwed spindle for actuating the jaws towards and away from one another, segmental mutilations in the thread of the nut and corresponding mutilations in the thread of the spindle along a length thereof, some of the thread being cut away to the whole of its depth and some to a portion only of its depth.

5. A work-holding vise comprising concentric cylindrical members fixed to co-operating jaws, a co-operating nut and screw carried by said cylindrical members, respectively, for effecting relative axial movement thereof, and corresponding segmental mutilated threads on the nut and screw adapted to register in one angular position of the screw with respect to the nut to allow of the separation or bringing together of the jaws without relative rotation between the nut and screw, some of the thread being cut away to the whole of its depth and some to a portion only of its depth.

6. A work-holding vise comprising concentric cylindrical members formed integrally with co-operating jaws, means adjustably clamping the outer cylindrical member, a screwed spindle swiveled in one cylindrical member, and a nut threaded on said spindle and anchored in the other cylindrical member, the threads of said nut and spindle being correspondingly mutilated to allow relative axial movement between the nut and spindle without relative rotation therebetween when the nut is angularly disposed with respect to the spindle in a predetermined position, some of the thread being cut away to the whole of its depth and some to a portion only of its depth.

7. A work-holding vise comprising a fixed tubular member, a rear jaw carried thereby, an inner tubular member slidably located within the fixed member, a front jaw carried by the inner tubular member, a nut located within the inner tubular member and anchored in the fixed tubular member, the nut having an uneven segmentally-mutilated thread, and a screwed spindle carried by the front jaw and inner tubular member, the spindle co-operating with the nut and having similar mutilations on its thread whereby the spindle can be withdrawn from the nut, when in one angular position out of each 360° with respect thereto, without being rotated, and whereby in all other angular positions contact will be effected in at least two places between the nut and screw.

8. A work-holding vise comprising a fixed tubular member, a rear jaw carried thereby, an inner tubular member slidably located within the fixed member, a front jaw carried by the inner tubular member, a nut located within the inner tubular member and anchored in the fixed tubular member, the nut having an uneven segmentally-mutilated thread, and a screwed spindle carried by the front jaw and inner tubular member, the spindle co-operating with the nut and having similar mutilations on its thread whereby the spindle can be withdrawn from the nut, when in one angular position with respect thereto, without being rotated, some of the thread being cut away to the whole of its depth and some to a portion only of its depth.

9. A work-holding vise comprising a fixed tubular member having a rear jaw at one end, an inner tubular member slidably mounted in the fixed tubular member and having a front jaw at the appropriate end, a screwed spindle mounted in the inner tubular member, a nut threaded on the spindle, the nut having a radial lug extending through a longitudinal slot in the inner tubular member into a retaining hole in the fixed tubular member and a second lug extending into a longitudinal groove on the inner face of the inner tubular member, and corresponding uneven segmental mutilations in the thread of the nut and of the spindle.

10. A work-holding vise comprising a fixed tubular member having a rear jaw at one end, an inner tubular member slidably mounted in the fixed tubular member and having a front jaw at the appropriate end, a screwed spindle mounted in the inner tubular member, a nut threaded on the spindle, the nut having a radial lug extending through a longitudinal slot in the inner tubular member into a retaining hole in the fixed tubular member and corresponding uneven segmental mutilations in the thread of the nut and of the spindle, some of the thread being cut away to the whole of its depth and some to a portion only of its depth.

CLAUDE GEORGE HENRY SWINDEN.